United States Patent [19]

Vanttila et al.

[11] Patent Number: 5,794,142
[45] Date of Patent: Aug. 11, 1998

[54] MOBILE TERMINAL HAVING NETWORK SERVICES ACTIVATION THROUGH THE USE OF POINT-TO-POINT SHORT MESSAGE SERVICE

[75] Inventors: Jaakko Vanttila; Seppo Alanara; Jorma Seppanen, all of Oulu; Juha Vaihoja, Tupos; Mikko Lietsalmi, Oulu, all of Finland

[73] Assignee: Nokia Mobile Phones Limited, Salo, Finland

[21] Appl. No.: 592,945

[22] Filed: Jan. 29, 1996

[51] Int. Cl.$^6$ .................................. H04Q 7/22
[52] U.S. Cl. .................... 455/419; 455/466; 455/414
[58] Field of Search ..................... 379/58, 59, 63; 455/33.1, 89

[56] References Cited

U.S. PATENT DOCUMENTS

| | | | |
|---|---|---|---|
| 5,046,082 | 9/1991 | Zicker et al. | 379/59 |
| 5,276,729 | 1/1994 | Higuchi et al. | 379/58 |
| 5,351,235 | 9/1994 | Lahtinen | 455/53.1 X |
| 5,371,782 | 12/1994 | Casey, III et al. | 379/61 |
| 5,404,580 | 4/1995 | Simpson et al. | 455/89 |
| 5,479,476 | 12/1995 | Finke-Anlauff | 379/58 |
| 5,485,405 | 1/1996 | Norman et al. | 379/58 |
| 5,577,103 | 11/1996 | Foti | 379/59 |
| 5,588,042 | 12/1996 | Comer | 379/59 |
| 5,603,084 | 2/1997 | Henry, Jr. et al. | 455/33.1 |

FOREIGN PATENT DOCUMENTS

| | | |
|---|---|---|
| 0 478 231 A2 | 4/1992 | European Pat. Off. |
| 0 630 167 A2 | 12/1994 | European Pat. Off. |
| 2 249 923 | 5/1992 | United Kingdom |
| 2256 113 | 11/1992 | United Kingdom |

OTHER PUBLICATIONS

Over-the-Air Activation Teleservice (OATS), Dec. 15, 1995, pp. 329-368.

"Proposed new SMS services", SMS.JEM/94.03.21, Mar. 22, 1994, Seppo Alanara.

"Proposed Feature/Service code List", TR45.3.6/94.04.06.16, Digital Cellular Systems, Mark Wells, Seppo Alanara, Apr. 5-7, 1994.

IS-136.1 Rev O, May 17, 1995, Section 7, pp. 286-307.

*Primary Examiner*—Dwayne D. Bost
*Assistant Examiner*—William G. Trost
*Attorney, Agent, or Firm*—Perman & Green, LLP

[57] ABSTRACT

A radiotelephone (10) includes a keypad (22) having a plurality of keys (22a, 22b) and a display device (20) for displaying information, including messages, to a user. A method includes the steps of: (a) transmitting a point-to-point short message service (SMS) message from an operator's site (36) through a network (32) to the radiotelephone; (b) receiving the SMS message from the network; (c) interpreting the received SMS message; and (d) activating a network service function that is specified in received SMS message. The method includes a preliminary step of transmitting a SMS message from the radiotelephone to the operator's site, the SMS message requesting activation of the network function.

27 Claims, 4 Drawing Sheets

FIG. 3A

MAIN MENU F — PART OF MEMORY 24

| | |
|---|---|
| \ | MEMORY OPTIONS |
| \ | MESSAGES |
| \ | PHONE SETTINGS |
| \ | NETWORK SERVICES |
| \ | CALL WAITING |
| \ | SEND OWN NUMBER |
| X | CALL FORWARDING |
| X | FORWARD ALL |
| X | IF NO REPLY |
| X | IF NOT REACHABLE |
| X | CANCEL FORWARDING |

\ = ENABLED   X = DISABLED

FIG. 3B

MAIN MENU F — PART OF MEMORY 24

| | |
|---|---|
| \ | MEMORY OPTIONS |
| \ | MESSAGES |
| \ | PHONE SETTINGS |
| \ | NETWORK SERVICES |
| \ | CALL WAITING |
| \ | SEND OWN NUMBER |
| \ | CALL FORWARDING |
| \ | FORWARD ALL |
| \ | IF NO REPLY |
| \ | IF NOT REACHABLE |
| \ | CANCEL FORWARDING |

\ = ENABLED   X = DISABLED

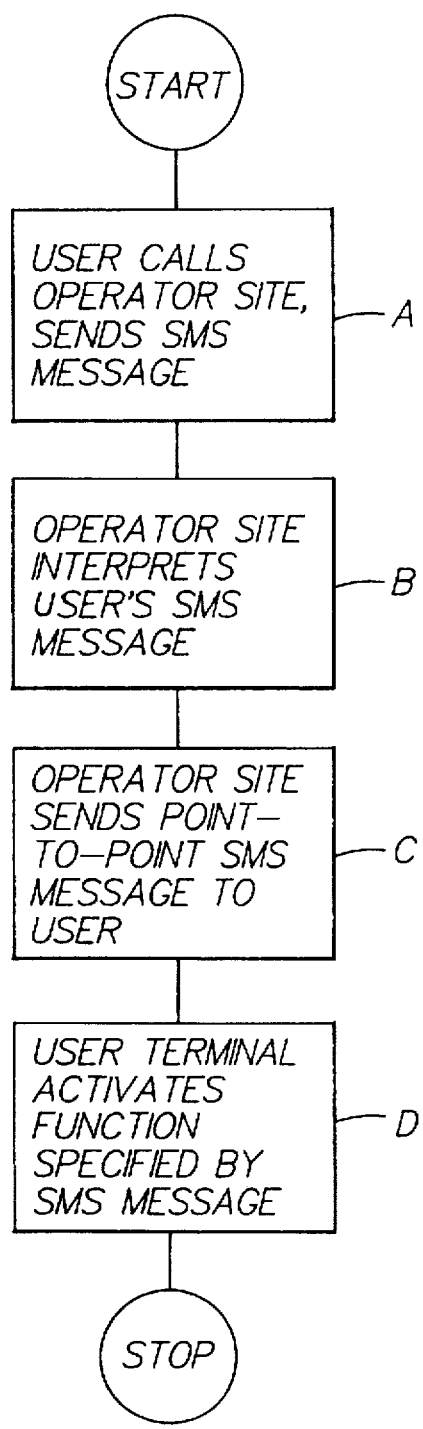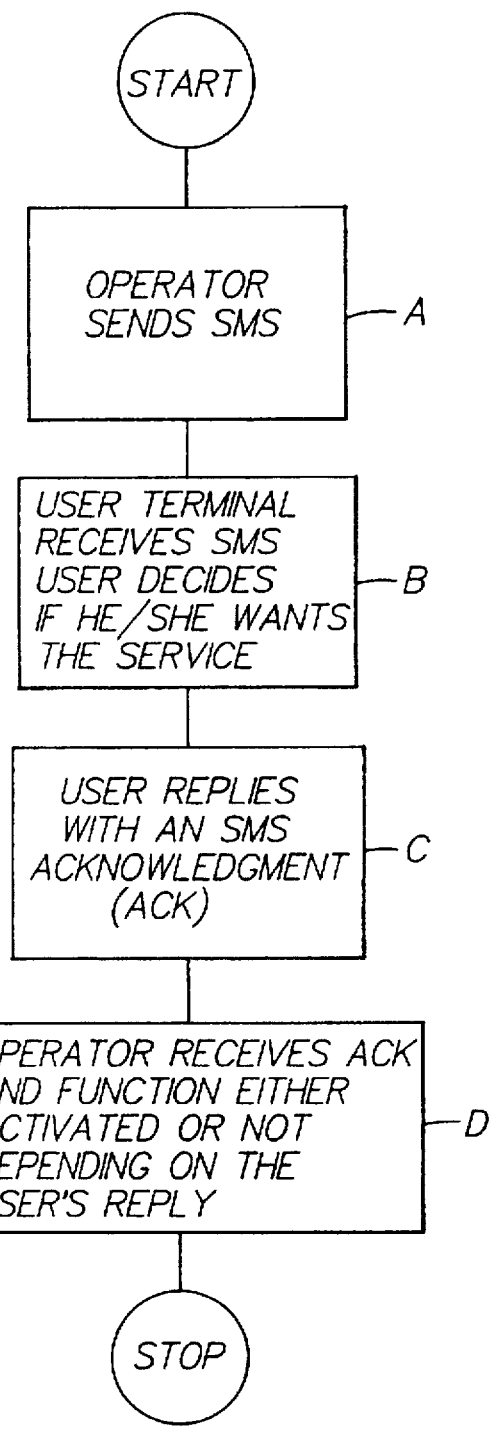

MOBILE TERMINAL HAVING NETWORK SERVICES ACTIVATION THROUGH THE USE OF POINT-TO-POINT SHORT MESSAGE SERVICE

FIELD OF THE INVENTION

This invention relates generally to radiotelephones and, in particular, to mobile terminals such as those capable of operation with a cellular network.

BACKGROUND OF THE INVENTION

Modern mobile terminals or mobile stations provide a number of valuable features such as network-related functions. These network-related functions can include call forwarding, call waiting, and various roaming related functions such as 'do not disturb'. As can be appreciated, not all cellular system operators may support a range of such features. As may also be appreciated, not all users may wish to take advantage of (and pay additionally for) these typically value added features.

In order to simplify the construction of the mobile stations it is convenient to pre-program the unit with a full complement of network-related and other functions. However, only certain of these functions are initially activated for use. By example, and assuming the mobile station includes a display for displaying a menu of available functions, only those functions that are activated will appear in the menu. All other non-activated functions are not displayed in the menu and are thus "hidden" from the user.

It is known or proposed in the art that when a mobile terminal is first purchased for the dealer to connect a data port of the mobile station to a programming device, e.g., a computer, and to activate user-selected functions through the data port, with or without the cooperation with a microprocessor device that is internal to the mobile terminal. The particular functions can be defined by predetermined 'feature codes'. The user could also subsequently return to the dealer to have a certain function or functions activated after purchase. However, this procedure is inconvenient for the user.

It is known in the art, as evidenced by U.S. Pat. No. 5,371,782, to enable a cordless telephone handset to generate a service request that contains a specific carrier request code. The handset selectively identifies a public base unit served by a desired local service provider and establishes a communications link with the base unit. An alerting signal can also be generated for indicating to the user that a desired local service provider was not reached.

It is known in the art, as evidenced by U.S. Pat. No. 5,046,082, to provide a system allowing remote access to cellular telephone programming through the PSTN. The system includes a specifically configured, remotely accessible cellular telephone referred to as a RACT. The RACT includes a signal detection circuit configured to detect a unique identifying signal that the host system generates and that is not commonly found in conventional data communications traffic.

It is also known in the art, as evidenced by U.S. Pat. No. 5,276,729, to provide a radiotelephone that can be remotely programmed through the use of DTMF signals.

It is also known in the art, as evidenced by European Patent Application publication number: 0 630 167 A2, to provide a personal communicator that can receive and store a number assignment module (NAM). The NAM is received from a cellular service provider, without having an authorized agent manually program the personal communicator. The personal communicator places a call to a service bureau which receives the call. The call includes information comprising the potential subscriber's credit information, vendor identification, and electronic serial number (ESN). In response, the service bureau encrypts the NAM and transmits if for storage in the personal communicator.

The so-called Short Message Service (SMS) is a service specified in modern cellular systems which enables a user to send messages to, and receive text messages, from other users of a communications (cellular) network. The SMS attempts to deliver a message to a mobile terminal whenever the terminal is registered to the network, even when the terminal is engaged in a voice or data call. The terminal may also roam throughout the network and still be capable of sending and receiving messages. A terminal configured for SMS provides methods for the user to receive, read, write/ edit, clear, send, and save messages. The connection of a standard keyboard to the terminal facilitates the generation and editing of text messages by the user.

One of the inventors of the subject matter of this patent application has previously proposed a network service feature code broadcast service, wherein short messages within a fixed category channel of the Broadcast SMS would contain one or multiple feature access strings and related short alphanumeric name string which describes a particular network feature (SMS.JEM/94.03.21., "Proposed new SMS services", S. Alanärä, Mar. 22, 1994). This same inventor has also proposed the use of a Feature/Service Code List that would make the codes more accessible to users. This service would provide a list of service/feature codes using the E-BCCH. A receiving mobile station is said to be able to extract the feature information to be usable as a scrollable menu for user feature/service selection (TR45.3.6/ 94.04.06.16, Digital Cellular Systems, "Proposed Feature/ Service Code List", S. Alanärä et al., Apr. 5–7, 1994).

As may be appreciated, it is desirable to provide an efficient and simple user interface to enable a user to specify and request that a particular network feature or service be activated, and further to provide an efficient and simple mechanism to enable a network provider or operator to remotely activate a specified feature.

OBJECTS OF THE INVENTION

It is thus a first object of this invention to provide an efficient and simple technique for enabling a user of a mobile terminal to request and receive a network service.

It is a second object of this invention to provide a mobile terminal having SMS capability, and that furthermore provides a SMS user interface that enables a user to generate a SMS message that requests an operator to activate a selected mobile terminal function, the mobile terminal further being capable of receiving a point-to-point SMS message from the operator that activates the selected mobile terminal function.

SUMMARY OF THE INVENTION

The foregoing and other problems are overcome and the objects of the invention are realized by methods and apparatus in accordance with embodiments of this invention. A method of this invention is disclosed for operating a user terminal, such as a cellular radiotelephone, of a type that is bidirectionally coupled to a network through an RF interface. The cellular radiotelephone includes a keypad having a plurality of keys and a display device for displaying information, including messages, to a user. The method includes the steps of: (a) transmitting a point-to-point short message service (SMS) message from an operator's site through a network (32) to the radiotelephone; (b) receiving the SMS message from the network; (c) interpreting the received SMS message; and (d) activating a network service function that is specified in received SMS message. The method includes a preliminary step of transmitting a SMS message from the radiotelephone to the operator's site, the SMS message requesting activation of the network function.

Also disclosed is a method for operating a mobile terminal of a type that is bidirectionally coupled to a network through a digital cellular interface, comprising the steps of (a) sending a short message service (SMS) from the network to the mobile terminal, the SMS message of offering a service; (b) sending a reply to the SMS message from the mobile terminal to the network, the reply containing data for indicating one of an acceptance of the offered service and a non-acceptance of the offered service; and (c) receiving the reply at the network and selectively one of activating the offered service for the mobile terminal and not activating the offered service for the mobile terminal, in accordance with the data sent with the reply.

BRIEF DESCRIPTION OF THE DRAWINGS

The above set forth and other features of the invention are made more apparent in the ensuing Detailed Description of the Invention when read in conjunction with the attached Drawings, wherein:

FIGS. 3A and 3B depict a content of the mobile terminal memory both before (FIG. 3A) and after (FIG. 3B) the activation of a network function in accordance with this invention;

FIG. 4 is a logic flow diagram that illustrates a first method of this invention; and FIG. 5 is a logic flow diagram that illustrates a second method of this invention.

DETAILED DESCRIPTION OF THE INVENTION

Figure 1:
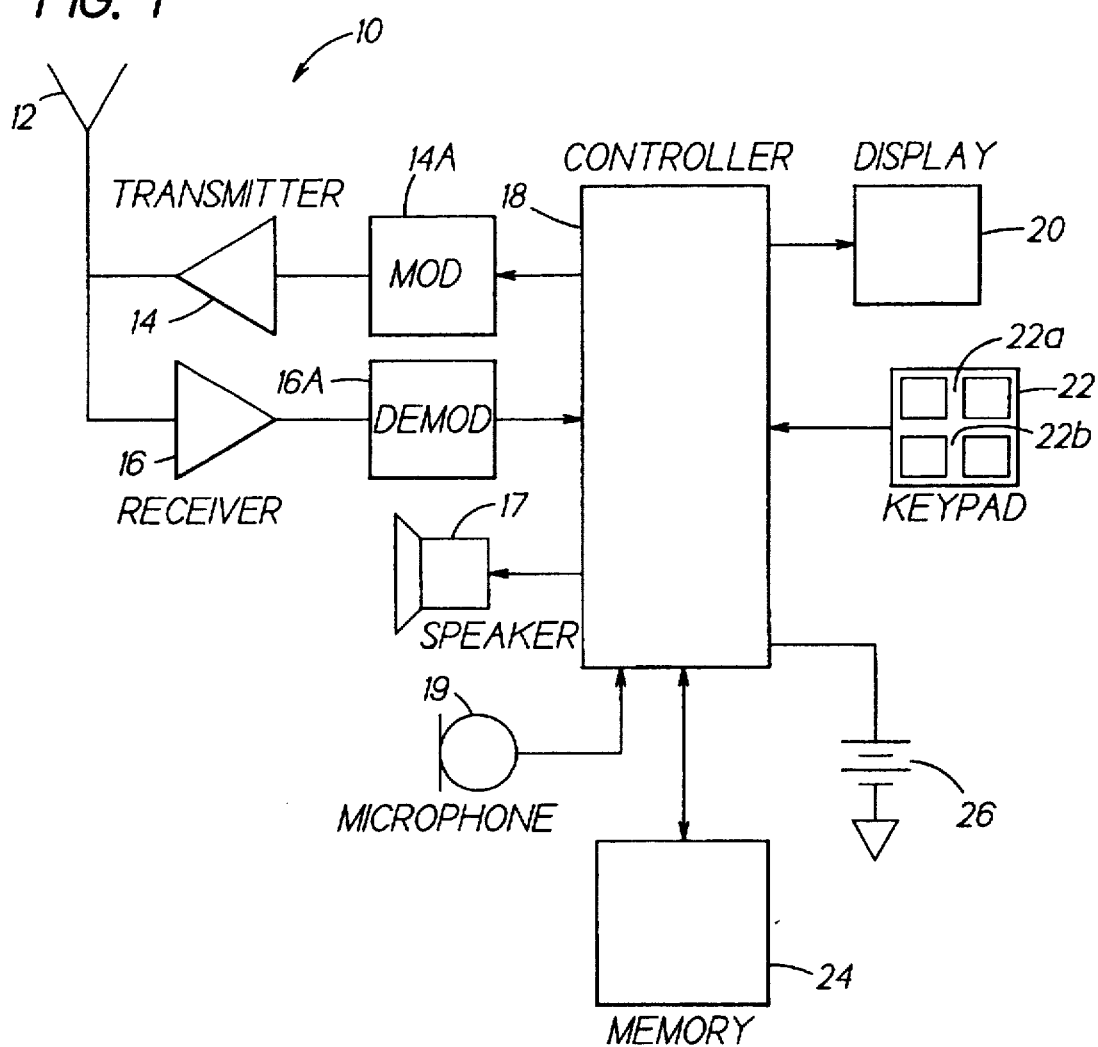
FIG. 1 is a block diagram of a mobile terminal that is constructed and operated in accordance with this invention.
Figure 2:
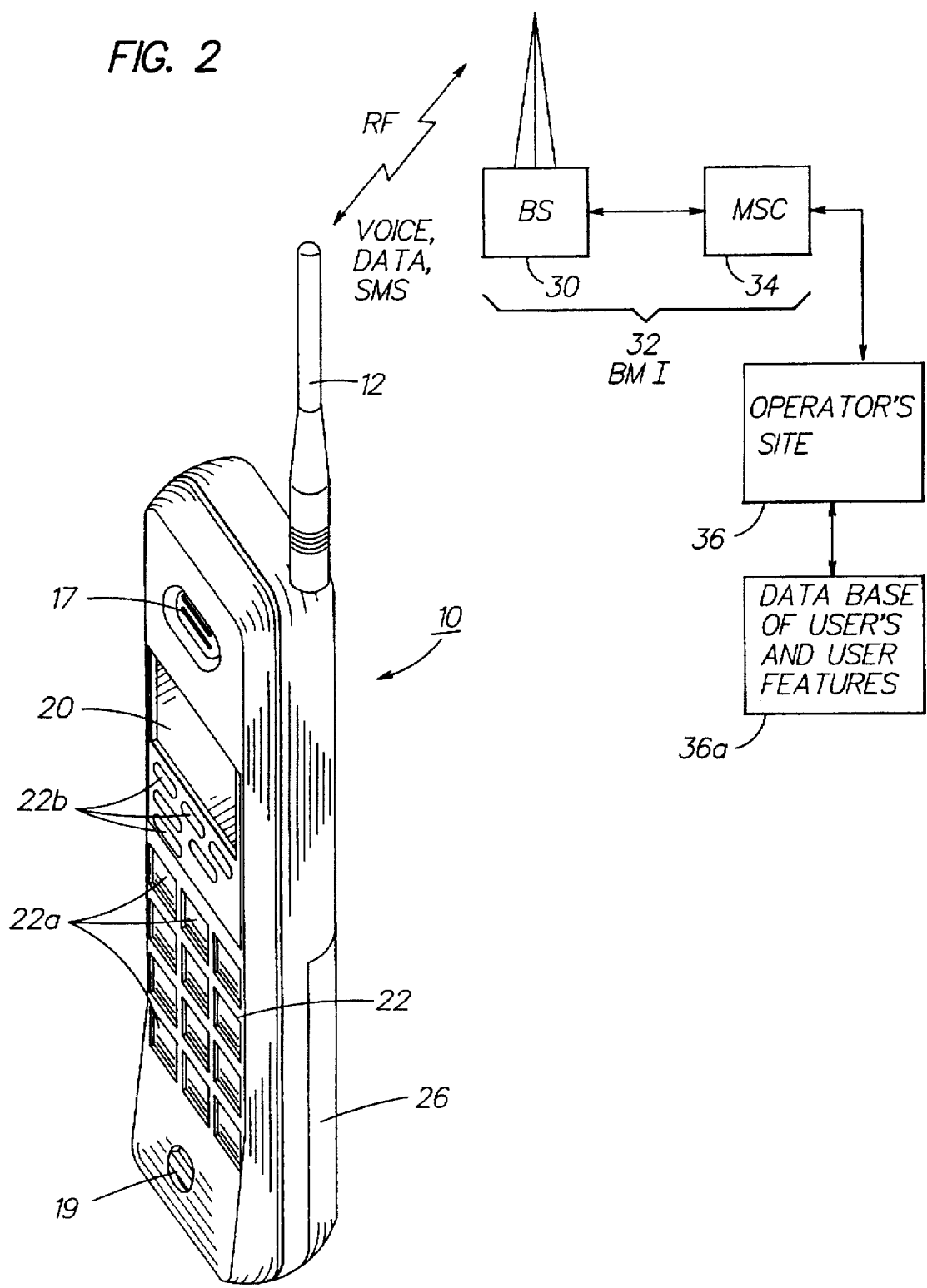
FIG. 2 is an elevational view of the mobile terminal shown in FIG. 1, and which further illustrates a cellular communication system to which the mobile terminal is bidirectionally coupled through wireless RF links.

Reference is made to FIGS. 1 and 2 for illustrating a mobile terminal 10, in particular a cellular radiotelephone, that is suitable for practicing this invention. The mobile terminal 10 includes an antenna 12 for transmitting signals to and for receiving signals from a base site or base station 30. The base station 30 is a part of a cellular network 32 that includes a mobile switching center (MSC) 34. The MSC 34 is capable of routing messages to and from the user terminal 10 when the user terminal is registered with the network.

The mobile terminal includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data. The air interface standard is assumed for this invention to include a SMS capability, and in particular to include a point-to-point SMS capability. That is, a SMS message can be addressed to a specific mobile terminal, although the mobile terminal may also be capable of receiving and responding to broadcast (e.g., global) messages that address a plurality of mobile terminals.

A user interface includes a conventional speaker 17, a conventional microphone 19, a display 20, and a user input device, typically a keypad 22, all of which are coupled to the controller 18. The keypad 22 includes the conventional numeric (0-9), alphanumeric and related keys (#,*) 22a, and also other keys 22b used for operating the mobile terminal 10. These other keys 22b may include, by example, a SEND key, various menu scrolling and soft keys, and a PWR key.

The mobile terminal 10 also includes various memories, shown collectively as the memory 24, wherein are stored a plurality of constants and variables that are used by the controller 18 during the operation of the mobile terminal. For example, the memory 24 stores the values of various cellular system parameters and the number assignment module (NAM). An operating program for controlling the operation of controller 18 is also stored in the memory 24 (typically in a ROM device). The memory 24 also stores data, including user messages, that are received from the cellular network 32 prior to the display of the messages to the user. The mobile terminal 10 also includes a battery 26 for powering the various circuits that are required to operate the terminal.

It should be understood that the mobile terminal 10 can be a vehicle mounted or a handheld device. It should further be appreciated that the mobile terminal 10 can be capable of operating with one or more air interface standards, modulation types, and access types. By example, the mobile terminal may be capable of operating in accordance with a frequency modulated (FM), frequency division multiple access (FDMA) transmission and reception standard, such as one known as EIA/TIA-553 (AMPS). The terminal may also be capable of operating with any of a number of other analog or digital standards, such as GSM, EIA/TIA 627 (DAMPS), IS-136 (DDAMPS), and IS-95 (CDMA). Narrow-band AMPS (NAMPS), as well as TACS, mobile terminals may also benefit from the teaching of this invention. In general, the teaching of this invention applies to any radiotelephone or pager user terminal that is capable of receiving a message from a system, that includes a display for displaying messages and a menu of mobile terminal functions to a user, and that furthermore includes a user input device, such as a keypad, with which the user can generate messages and also interact with the displayed menu to select various mobile terminal functions. It should thus be clear that the teaching of this invention is not to be construed to be limited to any one particular type of mobile terminal or air interface standard.

In general, the operating program in the memory 24 includes routines to present messages and message-related functions to the user on the display 20, typically as various menu items. The memory 24 also includes routines for implementing the method described below in relation to FIGS. 3A, 3B and 4.

Reference is now made to FIGS. 3A, 3B and 4 for illustrating a first method in accordance with this invention. The method will be described in the context of one existing interim cellular digital standard (i.e., IS-136) that provides a Short Message Service (SMS) capability, although the teaching of this invention is not limited for use only with this one particular interim standard.

The IS-136 specification specifies the structure and information elements of SMS messages in paragraphs 7.1–7.3 (IS-136.1, Rev. 0, 5/17/94, pp. 286–307). There is an information element referred to in paragraph 7.2.1 as a "User Data Unit", which is specified to carry a user text message. One field of this information element is referred to as an "Encoding Identifier". As is indicated on page 304, the Encoding Identifier field of the User Data Unit is specified to be five bytes long (that is 32 possible values). At present, the specification only specifies the function of two values. All other values are reserved for later use.

It should be noted that it is also within the scope of this invention to use, in another embodiment, the higher layer protocol identifier in the R-Data unit structure for this purpose. See, for example, IS-136, paragraph 6.5, Information Element Description-R-Data Unit.

In accordance with a preferred, but not limiting, embodiment of this invention, the Encoding Identifier field is used to identify the SMS message as containing special information targeted for use for software update purposes. The SMS message contains two logical parts. A first part is a text part, which informs the user that by receiving the message a new menu feature will appear on mobile station's display 20. A second part (invisible to the user), transfers the needed information elements to the mobile station 10. Based on this information the mobile station 10 activates the menu feature. These two parts could be sent as two separate SMS messages, or as one SMS message.

The following table is exemplary of the teaching of this invention. These feature and corresponding feature codes are as specified by the North American Cellular Network.

TABLE

| Feature Name | Feature Code | Ident. Code |
| --- | --- | --- |
| Roaming Do Not Disturb (activation) | *35 | RND-A |
| Roaming Do Not Disturb (deactivation) | *350 | RND-D |
| Call Forwarding Immed. (activation) | *71 | CFI-A |
| Call Forwarding Immed. (deactivation) | *710 | CFI-D |
| Call Forwarding Cond. (activation) | *72 | CFC-A |
| Call Forwarding Cond. (deactivation) | *720 | CFC-D |
| Call Forwarding Busy (activation) | *73 | CFB-A |
| Call Forwarding Busy (deactivation) | *730 | CFB-D |
| Call Forwarding No. Ans. (activation) | *74 | CFN-A |
| Call Forwarding No. Ans. (deactivation) | *740 | CFN-D |
| Call Waiting-canel | *810 | CW-C |

The operator 36 sends to the mobile station 10 one of the above-referenced identification codes to define which menu function is to be activated, and also sends a corresponding feature code. When the mobile station 10 receives the SMS message it checks the "Encoding Identifier" field to see if this is a software update SMS message. If it is, the software then reads the corresponding "User Data" unit and finds the code, which identifies the updated menu feature and a corresponding feature code. The mobile station 10 then stores the feature code into a correct non-volatile memory 24 location and the menu function is then enabled for use.

Referring to FIG. 3A, there is illustrated a number of functions and associated flags (F), some of which are activated (/) and some of which are disabled (X). In the example of FIG. 3A the call forwarding functions are disabled and, as such, do not appear as menu items on the mobile station's display 20. It should be realized, however, that the various software modules required to implement the call forwarding features may have been programmed into the memory 24 when the mobile station 10 was first assembled and/or activated.

FIG. 3B illustrates the contents of the memory 24 after receiving at least one SMS message from the operator's site 36, the SMS message conveying feature and identification codes that cause the controller 18 to access the memory 24 and enable the call forwarding functions. After being so enabled, the call forwarding functions appear in the displayed menu, and are thus accessible for use by the user of the mobile station 10.

Referring now to FIG. 4, at Block A the user sends a SMS message, that identifies a function to be activated (or possibly deactivated), to the network provider's site . A special menu function can be used for this purpose, wherein the user selects a desired function from a displayed list of non-enabled functions, and wherein the mobile station in response composes and transmits a suitable SMS message identifying the selected function. In this manner the user need not be aware of the underlying identifying codes and the like. Furthermore, the telephone number of the operator site can be pre-programmed into the mobile station 10 at the time that the mobile station is first activated for use.

At Block B the operator site 36 receives and interprets the SMS message. In this regard the operator site 36 includes a database 36a of mobile stations and already activated features associated with each of the mobile stations. The operator site 36 authenticates the request for activating a new function (the mobile station's identity can be ascertained from information received with the message), and updates the database 36a accordingly.

At Block C the operator site 36 composes a suitable SMS message, as described above, and transmits same to the mobile terminal 10 for activating the specified function.

At Block D the mobile station 10 receives the SMS message from the operator site 36 and processes same to enable the specified function to appear in the menu displayed on the display 20.

In greater detail, the Block D includes the execution of the following steps.

D-1. The mobile station receives the SMS message having an Encoding Identifier field set for indicating that the SMS message is a software (function) update message.

D-2. The mobile station 10 checks the Encoding Identifier field. If the value is, for example 00011, the mobile station 10 is informed that this is a special menu update SMS message, and it is treated as such from this point. (In this case the operator and phone manufacturer have previously agreed that the value 00011 identifies the menu update message.) If the Encoding Identifier field does not equal the predetermined value, the SMS message is displayed as a normal SMS message to the user.

D-3. The mobile station 10 reads the corresponding User Data field of the SMS message and locates the network service identification code, for example CFC-A (Call Forwarding Conditional-Activation), and corresponding feature code, for example *72. Again, it is assumed that the operator and phone manufacturer have previously agreed that CFC-A indicates Call Forwarding Conditional Activation.

D-4. The mobile station 10 identifies the menu item to be enabled based on the network service identification code CFC-A. In this case the menu's Call Forwarding-Conditional item is enabled.

D-5. The mobile station 10 stores the feature code *72 into a non-volatile location in memory 24 dedicated for the specified menu item. As such, the displayed menu will now display this newly activated function, thereby enabling the user to gain access to this function.

In a further embodiment the identification code may be the actual menu text. That is, this mode of operation can be employed if there is no other functionality in the menu item than sending the feature code to the network. For example, Call Waiting activation is one such feature.

As can be appreciated, the use of this invention enables menu features to be both selectively activated and deactivated. Furthermore, the use of this invention does not require that non-standard signalling formats be implemented, as is the case in some prior art approaches. Instead, this invention provides for simple enhancements to existing signalling formats (e.g., the SMS message format) to implement an efficient technique for selectively enabling and disabling functions within a mobile terminal or station.

Although described in the context of a mobile station having a keypad for receiving input from a user, it is within the scope of this invention to employ any suitable type of user input interface. By example, if the mobile terminal is connected to a computer, the feature selection procedure can be accomplished using the computer's screen and/or keyboard. Alternatively, a suitable mobile station or computer voice recognition system can be employed for performing this function.

Furthermore, and as was indicated previously, the teaching of this invention is not limited for use with any one particular type of message delivery protocol (such as the one specified by IS-136).

It should also be appreciated that although the invention has been described in the context of a method wherein the mobile station 10 first calls the operator's site 36 to request that a specific function be enabled, it is also within the scope of this invention to compose and generate a special message at the network operator's site without first receiving a call from the mobile station. In this case the network operator's site 36 can call the mobile terminal 10 and selectively enable or disable a specific function or functions. For example, a particular network operator may decide to make a certain function available to one or more selected mobile stations on a trial or temporary basis. Also by example, the network operator may decide, based on some criteria, to disable one or more previously enabled network functions for a selected mobile station. In either case, the network operator is enabled to send the special SMS message, that selectively enables or disables one or more functions. To a selected mobile station without first receiving a message from the mobile station.

In this case the mobile user may accept or reject the network service. Thus the operator can promote new services, e.g., "Do you want to subscribe to xxx? 1=yes, 2=no" and the user then sends an acknowledgment with a SMS manual acknowledgment (1 or 2). This mode of operation is illustrated in the flow chart of FIG. 5, wherein in Block A the operator sends the SMS offering the service, and in Block B the user decides whether to accept or reject the offered service. In Block C the user replies with a SMS manual acknowledgement (e.g., by depressing 1 to accept the offered service or by depressing 2 to reject the offered service). At Block D the operator receives the user's manual acknowledgment and either activates the offered service or does not activate the offered service, depending upon the user's reply at Block C.

It is also within the scope of this invention for the user to send a SMS message to the operator in order to request a specific function or service to be enabled, i.e., a call is not required.

It should be realized that the specific functions that were described above are exemplary only. By example, other functions that can be selectively activated and deactivated using the special SMS message of this invention include, but are not limited to, Call Delivery (CD), Call Transfer (CT), Call Waiting (CW), Calling Number Identification Restriction (CNIR), Conference Calling (CC), Flexible Alerting (FA), Message Waiting Notification (MWN), Preferred Language (PL), Subscriber PIN Access (SPINA) and Voice Message Retrieval (VMR).

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a mobile terminal of a type that is bidirectionally coupled to a network through a wireless interface, comprising the steps of:

receiving at least one message from the network, the message being addressed to the mobile terminal;

determining if the at least one message is a special message from a network operator that specifies one of enabling or disabling a mobile terminal network service feature that is already present in the mobile station, the special message comprising a predetermined Identification Code for specifying the network service feature that is to be enabled or disabled; and if the at least one message is determined to be a special message, storing data within a memory of the mobile terminal, the stored data selectively one of enabling or disabling the mobile terminal network service feature that is specified by the special message;

wherein the special message is a Short Message Service message having at least one field for identifying the SMS message as a special message.

2. A method as set forth in claim 1, wherein the SMS message has at least one other field for identifying a predetermined Feature Code associated with the network service feature.

3. A mobile terminal of a type that is bidirectionally coupled to a network through a wireless interface, comprising:

means for receiving at least one message from the network, the message being addressed to the mobile terminal; and control means for determining if the at least one message is a special message from a network operator that specifies one of enabling or disabling a mobile terminal network service feature that is already present in the mobile station, the special message comprising a predetermined Identification Code for specifying the network service feature that is to be enabled or disabled, and if the at least one message is determined to be a special message, for storing data within a memory of the mobile terminal, the stored data selectively one of enabling and disabling the mobile terminal network service feature that is specified by the special message;

wherein the special message is a Short Message Service message having one field for identifying the SMS message as a special message.

4. A mobile terminal as set forth in claim 3, wherein the SMS message has at least one other field for identifying a predetermined Feature Code associated with the network service feature.

5. A method for operating a mobile terminal of a type that is bidirectionally coupled to a network through a digital cellular interface, comprising the steps of:

receiving at least one Short Message Service message from the network, the SMS message being addressed to the mobile terminal;

determining if the at least one SMS message is a special SMS message from a network operator that specifies one of enabling or disabling a mobile terminal network service feature that is already present in the mobile station, wherein the special SMS message has at least one field for identifying the SMS message as a special SMS message; and if the at least one SMS message is determined to be a special SMS message, storing data within a memory of the mobile terminal, the stored data selectively one of enabling or disabling a mobile terminal network service feature that is also specified by the special SmS message, wherein the special SMS message has a User Data field having information for identifying a predetermined Feature Code and a predetermined Identification Code that are both associated with the network service feature, and wherein the mobile terminal stores the predetermined Feature Code into the memory, and displays the predetermined Identification Code to a user.

6. A method as set forth in claim 5, and further comprising the initial steps of:

selecting a network service feature at the mobile terminal;

composing a SMS message that identifies the selected network service feature;

calling a network operator site and delivering the SMS message during the call;

interpreting the SMS message at the network operator's site and composing the special SMS message in response to the interpreted message; and forwarding the special SMS message from the network operator's site to the mobile terminal.

7. A method as set forth in claim 5, wherein the step of storing includes a step of making an identification of the network service feature become visible as a menu item in a menu of available network service features that are displayed to the user.

8. A method for operating a mobile terminal of a type that is bidirectionally coupled to a network through a digital cellular interface, comprising the steps of:

sending a short message service (SMS) message from the network to the mobile terminal, the SMS message having at least one field for identifying the SMS message as a special message for offering a network service feature to the mobile station, the offered network service feature being already present in 'the mobile station but disabled for use;

sending a reply to the SMS message from the mobile terminal to the network, the reply containing data for indicating one of an acceptance of the offered network service feature or a non-acceptance of the offered network service feature; and receiving the reply at the network and selectively one of activating the offered network service feature for use by the mobile terminal or not activating the offered network service feature for use by the mobile terminal, in accordance with the data sent with the reply, wherein if the offered network service feature is activated for use the network sends a message to the mobile station, the message containing information for specifying a disabled network service feature that is to be enabled by the mobile station.

9. A method for operating a mobile terminal of a type that is bidirectionally coupled to a network through a digital cellular interface, comprising the steps of:

receiving at least one point-to-point message from the network that is addressed to the mobile terminal;

determining if the at least one message is a special message from a network operator that specifies that an already enabled mobile terminal network service feature be disabled, wherein the special message has at least one field for identifying the message as a special message;

if the at least one message is determined to be a special message, storing data within a memory of the mobile terminal, the stored data disabling a mobile terminal network service feature that is also specified by the special message; and subsequently terminating the displaying of an identification of the disabled network service feature as one of an enabled network service feature to an operator of the mobile station;

wherein the disabled network service feature remains stored in the mobile station such that it can be subsequently enabled for operation in response to a another special message from the network operator.

10. A method as in claim 9, wherein the at least one received point-to-point message is a Short Message Service message.

11. A method for operating a mobile terminal of a type that is bidirectionally coupled to a network through a digital cellular interface, comprising the steps of:

receiving at least one point-to-point message from the network that is addressed to the mobile terminal;

determining if the at least one message is a special message from a network operator that specifies that a pre-stored and disabled network service feature is to be enabled for operation, wherein the special message has at least one field for identifying the message as a special message;

if the at least one message is determined to be a special message, storing data within a memory of the mobile terminal, the stored data enabling the operation of a mobile terminal network service feature that is also specified by the special message; and subsequently beginning the display of the network service feature as one of an enabled network service feature to an operator of the mobile station.

12. A method as in claim 11, wherein the at least one received point-to-point message is a Short Message Service message.

13. A radiotelephone comprising an RF transceiver for bidirectionally coupling the radiotelephone to a communications network; said radiotelephone further comprising:

a memory for storing information, some of the stored information being information that is stored during an activation of said radiotelephone for authorizing said radiotelephone to make and receive calls, said memory further storing a plurality of software modules individual ones of which execute, when enabled for use, one of a plurality of predetermined communications network service features; and a controller coupled to said transceiver and to said memory, said controller being responsive to a receipt of a message from said communications network through said transceiver for storing additional information in said memory for enabling a disabled one of said plurality of software modules that is specified by data conveyed by said message, the message comprising a predetermined Identification Code for specifying the disabled one of said software modules that is to be enabled;

wherein said message is a point-to-point Short Message Service (SMS) message having at least one field for identifying the SMS message as a communications network service feature update SMS message.

14. A method for operating a mobile terminal of a type that is bidirectionally coupled to a network through a wireless interface, comprising the steps of:

receiving at least one message from the network, the message being addressed to the mobile terminal;

determining if the at least one message is a special message from a network operator that specifies one of enabling or disabling a mobile terminal network service feature that is already present in the mobile station; and if the at least one message is determined to be a special message, storing data within a memory of the mobile terminal, the stored data selectively one of enabling or disabling the mobile terminal network service feature that is also specified by the special message;

wherein the special message is a Short Message Service message having at least one field for identifying the SMS message as a special message.

15. A method as set forth in claim 14, wherein the step of storing data includes a further step of displaying a message to a user of the mobile terminal, the message identifying the mobile terminal network service feature that is specified by the special message.

16. A method as set forth in claim 14, and further comprising the initial steps of:

selecting a network service feature at the mobile terminal;

composing a message that identifies the selected network service feature;

calling a network operator site and delivering the message during the call;

interpreting the message at the network operator's site and composing the special message in response to the interpreted message; and forwarding the special message from the network operator's site to the mobile terminal.

17. A method as set forth in claim 14, wherein the SMS message has at least one other field for identifying a predetermined Feature Code and a predetermined Identification Code that are both associated with the network service feature.

18. A mobile terminal of a type that is bidirectionally coupled to a network through a wireless interface, comprising:

means for receiving at least one message from the network, the message being addressed to the mobile terminal; and control means for determining if the at least one message is a special message from a network operator that specifies one of enabling or disabling a mobile terminal network service feature that is already present in the mobile station, and if the at least one message is determined to be a special message, for storing data within a memory of the mobile terminal, the stored data selectively one of enabling and disabling the mobile terminal network service feature that is also specified by the special message;

wherein the special message is a Short Message Service message having one field for identifying the SMS message as a special message.

19. A mobile terminal as set forth in claim 18, and further comprising a display means for displaying a message to a user of the mobile terminal, the message identifying the mobile terminal network service feature that is specified by the special message.

20. A mobile terminal as set forth in claim 18, and further comprising:

user interface means for selecting a network service feature at the mobile terminal, said control means being responsive to the selected network service feature for composing a message that identifies the selected network service feature; and means for contacting a network operator site and for delivering the message to the network operator site.

21. A mobile terminal as set forth in claim 20, wherein the network operator's site is comprised of means for interpreting the message and composing the special message in response to the interpreted message.

22. A mobile terminal as set forth in claim 18, wherein the SMS message has at least one other field for identifying a predetermined Feature Code and a predetermined Identification Code that are both associated with the network service feature.

23. A radiotelephone comprising an RF transceiver for bidirectionally coupling the radiotelephone to a communications network; said radiotelephone further comprising:

a memory for storing information, some of the stored information being information that is stored during an activation of said radiotelephone for authorizing said radiotelephone to make and receive calls, said memory further storing a plurality of software modules individual ones of which execute, when enabled for use, one of a plurality of predetermined communications network service features; and a controller coupled to said transceiver and to said memory, said controller being responsive to a receipt of a message from said communications network through said transceiver for storing additional information in said memory for enabling a disabled one of said plurality of software modules that is specified by data conveyed by said message; wherein said message is a point-to-point Short Message Service (SMS) message having at least one field for identifying the SMS message as a communications network service feature update SMS message.

24. A radiotelephone as set forth in claim 23, wherein said radiotelephone further comprises a display and a data entry means that are coupled to said controller, said controller being further responsive to the receipt of said message for modifying a displayed list of enabled communications network service features to include a communications network service feature that is specified by said data conveyed by said message.

25. A radiotelephone as set forth in claim 24, wherein said radiotelephone further comprises a display and a data entry means that are coupled to said controller, said controller being responsive to information entered by a user for composing and transmitting a message to said communications network, said transmitted message identifying a communications network service feature to be enabled.

26. A radiotelephone as set forth in claim 24, wherein said controller is further responsive to a receipt of a further message from said communications network through said transceiver for storing further information in said memory for disabling an enabled one of said plurality of software modules that is specified by data conveyed by said further message.

27. A radiotelephone as set forth in claim 24, wherein said plurality of predetermined communications network service features comprise at least one of Call Forwarding, Call Delivery, Call Transfer, Call waiting, Calling Number Identification Restriction, Conference Calling, Flexible Alerting, Message Waiting Notification, Preferred Language, Subscriber PIN Access, and Voice Message Retrieval.

* * * * *